Patented Jan. 23, 1940

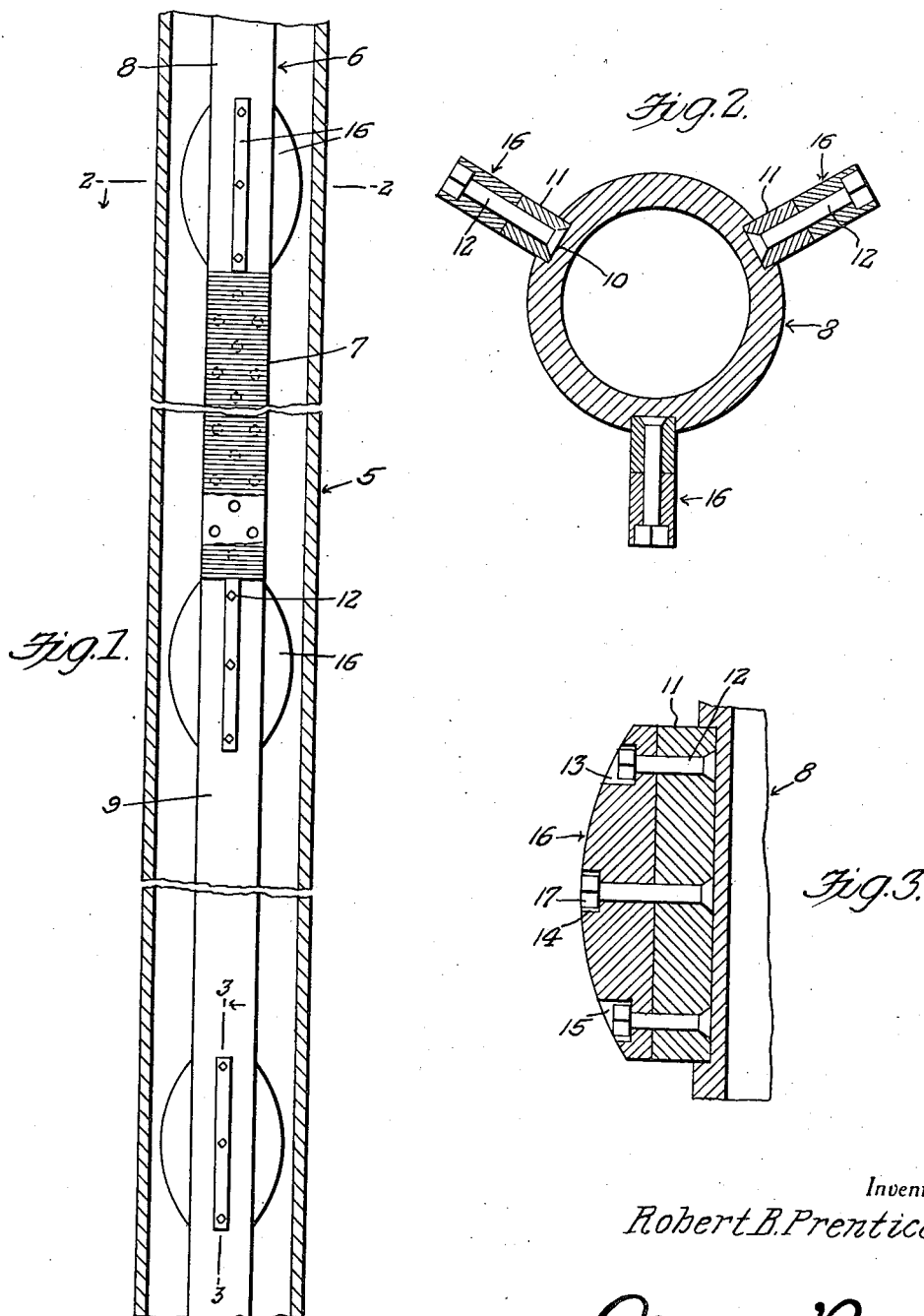

2,188,119

UNITED STATES PATENT OFFICE 2,188,119

CENTRALIZER AND PROTECTOR FOR AN OIL WELL STRING

Robert B. Prentice, Houma, La.

Application March 3, 1939, Serial No. 259,663

5 Claims. (Cl. 166—4)

My invention relates generally to means employed in the setting of screen, perforated pipe, liner and any tool or device in oil wells, and the like, and an important object of my invention is to provide simple and efficient means of the character indicated which positively centralizes and protects the oil well apparatus indicated, and as further described below.

Screen and liner are usually set in wells by employing a packer to seal the screen and liner to the casing already set in the well. To collapse and seal this packer, weight is set on the string of pipe lowering the screen and packer into the holer. The application of weight has the effect of bending the screen and liner and causing it to lay hard against one side of the protection string of casing, usually called the oil string.

The bending or kinking of the screen causes some part of it to come in contact with the walls of the casing in which it is set. This casing is perforated by mechanical means, namely, by a weight perforator or more commonly by guns that shoot bullets through the casing and surrounding cement, allowing fluid, such as oil, or gas, to enter the casing and come in contact with the screen.

The walls of the casing being perforated, as described, are not smooth and can tear the wire wrapping of the screen and cause an unprotected part of the screen to be exposed to action of fluid, sand and gas under pressure. This will quickly cut out a hole and allow sand to enter the screen and sand up or choke the well.

Bending the screen may easily spread the wire wrapping on screen which will have the same effect as a break in the wrapping, that is cutting out and sanding up the well.

The pressing of the screen against the perforated casing causes the screen to be exposed to the direct action of fluid, gas and sand coming through the perforations in said casing.

The screen centralizers of the present invention serve the double purpose of holding the screen directly in the center of the hole and affording protection to the screen as it is lowered into the hole. This is very important, as avoiding the damage described above.

It is imperative that the screen be placed on bottom of well intact, as the mesh of the screen regulates the flow of fluid or gas. The mesh openings average $9/1000$ of an inch, and vary according to the coarseness of the sand. If the screen is torn and larger holes are made in the mesh, sand will cut out the mesh and flow into the screen, stopping the flow of gas or fluid. Holes larger than the proper mesh cause cutting out and sanding up of a well.

In accordance with the present invention the screen is held away from the walls of the casing, leaving a space between the walls and the screen which minimizes the wear caused by fluid, gas or sand coming through the perforations in the casing.

Should it become necessary to remove the screen from the hole, the present invention permits this to be done easily. Whether the screen is cut out from the inside, employing a cutting tool, or washed over and recovered with a string of pipe, the operation will be greatly simplified by the manner in which the screen centralizer causes the screen to set squarely in the center of the hole.

The screen centralizers are to be spaced the length of the screen according to the size of the screen and size of casing or hole in which it is set.

The protectors or centralizers can be made of hard rubber, wood or suitable metal. The material used will depend on the chemical composition of the oil, fluid or gas in the area within which it is used.

The size of the screen and casing will also determine the materials used. For instance, when three-inch screen is set in seven-inch casing, the screen can easily be washed over and removed from the hole, and the protectors or centralizers in this case should be made of material that can be easily cut out.

The protectors or equalizers are fastened in a vertical position around the pipe, so as to permit the easy flow of fluid or gas either in an upward or downward direction around the screen, leaving ample space for the fluid to move through.

The foregoing and other objects and advantages of my invention will be apparent from a reading of the following description taken in connection with the drawing wherein for purposes of illustration I have set forth a preferred embodiment of my invention.

In the drawing:

Figure 1 is a general transverse vertical sectional view taken through an oil well showing the construction and method of application of the invention.

Figure 2 is an enlarged horizontal sectional view taken through Figure 1 approximately on the line 2—2 and looking downwardly in the direction of the arrow.

Figure 3 is an enlarged transverse vertical sectional view taken through Figure 1 approximately on the line 3—3 and looking toward the left in the direction of the arrow.

Referring in detail to the drawing, the numeral 5 generally designates the casing and the numeral 6 the string which is in accordance with the present invention composed of alternated perforated and imperforate sections, the perforated or screen section being designated by the numeral 7 and the imperforate sections 8 and 9 located at opposite ends of the perforated and wrapped screen section 7. In accordance with the present invention each of the imperforate sections 8 and 9 is provided with one or more centralizing features each consisting of a circumferentially spaced set of slots 10 which are horizontally aligned and have welded therein the rectangular base or bed blocks 11 through which project bolts 12 which pass through accommodating holes leading into the bottom of countersinks 13, 14 and 15, in the arcuate outer face of the protector shoes or bumpers 16, the said bolts receiving nuts 17 which when run up into place are located within the various countersinks, whereby the protector element 16 is radially and vertically aligned with its complemental base 11, and parallel to the axis of the particular imperforate section. The radial extension of the protectors described is not such as to continually bear against the inner surface of the casing 5, but they will extend sufficiently to prevent any close approach of the string, especially the screened portions thereof, to the side walls of the casing, while permitting free action of the string in the casing.

Persons skilled in the art to which the invention relates are conversant with the practice that when a screen is set in a well for production out of sand, the screen is soon surrounded and packed in by sand and shale, to such a degree that it often necessitates a cutting job of long duration, this being expensive indeed. It is not uncommon to have to cut the screen into six-inch pieces to be able to remove the same part-by-part under a laborious and time-consuming pulling method. Hence, the aforementioned idea of the washing-over process.

It is also well known in the oil industry that modern methods of producing oil necessitates removal of the screen from the well repeatedly and often. This is due to the rising of the level of salt water, plugging up of screen, or breaking in of dry gas, and cutting of the screen. The most used method of setting wells now is by setting the oil string (casing) through the producing sand and perforating it. Then the screen is set at the perforated point and production is thus acquired. The necessity of setting the screen in the center of the pipe by proper disruptable means emphasizes the need for the instant invention. My method and means properly centers the screen, and the mechanical means employed can be easily drilled out and washed-over, this permitting withdrawal of the screen.

Although I have shown and described herein a preferred embodiment of my invention, it is to be definitely understood that I do not desire to limit the application of my invention thereto, and any change or changes may be made in the materials and in the structure and arrangement of the parts, within the spirit of my invention and the scope of the subjoined claims.

Having described the invention, what is claimed as new is:

1. In a structure of the class described, an oil well string, said string comprising at least one screen portion and imperforate portions connected to opposite ends of said screen portion, at least one of said imperforate portions comprising string centralizing and protecting means, said means comprising rigidly anchored substantially non-compressible longitudinally curved projections extending radially from the string for engagement with the walls of a casing to protectively space the string therefrom.

2. A centralizer and protector for an oil well string, said centralizer and protector comprising a string section comprising longitudinally curved projections extending radially from said section, each projection comprising a base secured in a longitudinal slot formed in the outer side of the section, securing means extending from said base, and a removable piece having a longitudinally curved outer face, said piece being arranged to engage the radially outward face of said base with said securing means engaging portions of the piece.

3. In a structural assemblage of the class described, a tubular screen adapted to be removably arranged concentrically in a well casing, and groups of longitudinally spaced spacer units, each group comprising individual spacer units circumferentially spaced from each and projecting radially from the exterior surface of said screen, and each spacer unit being of a disruptive substantially non-compressible form, the disruptive portions thereof being adapted to be dislodged in fragmentary pieces by a known milling method.

4. In a structural assemblage of the class described, a tubular screen adapted for placement in a casing and radially projecting circumferentially spaced centralizing and spacing devices securely mounted on the exterior of said screen, each device comprising a solid bed block and a disruptable segmental crown companion block superimposed upon and secured to the bed block.

5. As a new article of manufacture and as a component part of an assemblage of the class described, a spacing device comprising a relatively fixed rectangular metal base block having longitudinally spaced shearable studs projecting beyond a predetermined face thereof, and a segmental disruptive crown block superimposed upon said studded face and secured to the studs at predetermined points of rupturable cleavage.

ROBERT B. PRENTICE.